United States Patent [19]

Hayes

[11] Patent Number: 4,717,394
[45] Date of Patent: Jan. 5, 1988

[54] POLYIMIDE GAS SEPARATION MEMBRANES

[75] Inventor: Richard A. Hayes, Hockessin, Del.

[73] Assignee: E. I. Du Pont de Nemours and Company, Wilmington, Del.

[21] Appl. No.: 923,486

[22] Filed: Oct. 27, 1986

[51] Int. Cl.$^4$ .............................................. B01D 53/22
[52] U.S. Cl. ........................................... 55/16; 55/68; 55/158; 210/500.39
[58] Field of Search ............... 55/16, 158, 68; 210/500.39; 528/342, 348

[56] References Cited

U.S. PATENT DOCUMENTS

| | | |
|---|---|---|
| Re. 30,351 | 7/1980 | Hoehn et al. ............... 55/158 X |
| 3,816,303 | 6/1974 | Wrasidlo ..................... 210/500.39 X |
| 3,822,202 | 7/1974 | Hoehn ......................... 210/500.39 X |
| 3,925,211 | 12/1975 | Schumann et al. ........ 210/500.39 X |
| 4,113,628 | 9/1978 | Alegranti ................... 210/500.39 X |
| 4,240,914 | 12/1980 | Iwama et al. ............... 210/500.39 |
| 4,358,378 | 11/1982 | Iwama et al. ............... 210/500.39 X |
| 4,370,290 | 1/1983 | Makino et al. .............. 264/184 |
| 4,378,324 | 3/1983 | Makino et al. .............. 210/500.39 X |
| 4,378,400 | 3/1983 | Makino et al. .............. 55/158 X |
| 4,440,643 | 4/1984 | Makino et al. .............. 210/500.39 X |
| 4,460,526 | 7/1984 | Makino et al. .............. 264/184 X |
| 4,474,662 | 10/1984 | Makino et al. .............. 55/158 X |
| 4,474,858 | 10/1984 | Makino et al. .............. 210/500.39 X |
| 4,485,056 | 11/1984 | Makino et al. .............. 210/500.39 X |
| 4,486,376 | 12/1984 | Makino et al. .............. 210/500.39 X |
| 4,528,004 | 7/1985 | Makino et al. .............. 55/158 |
| 4,532,041 | 7/1985 | Shuey et al. ................ 210/500.39 |
| 4,578,166 | 3/1986 | Uno et al. ................... 264/22 |

FOREIGN PATENT DOCUMENTS

| | | |
|---|---|---|
| 0043265 | 1/1982 | European Pat. Off. . |
| 113574 | 7/1984 | European Pat. Off. ............. 55/158 |
| 0125908 | 11/1984 | European Pat. Off. . |
| 0132221 | 1/1985 | European Pat. Off. . |
| 143552 | 6/1985 | European Pat. Off. ....... 210/500.39 |
| 0141781 | 6/1985 | European Pat. Off. . |
| 5344 | 1/1983 | Japan ..................................... 55/158 |
| 8512 | 1/1983 | Japan ..................................... 55/158 |
| 55313 | 3/1984 | Japan ..................................... 55/158 |
| 98704 | 6/1984 | Japan ..................................... 55/158 |
| 225705 | 12/1984 | Japan ..................................... 55/158 |
| 22902 | 2/1985 | Japan ..................................... 55/158 |
| 82103 | 5/1985 | Japan ..................................... 55/158 |
| 257805 | 12/1985 | Japan ..................................... 55/158 |
| 133106 | 6/1986 | Japan ............................. 210/500.39 |
| 133117 | 6/1986 | Japan ..................................... 55/158 |
| 133118 | 6/1986 | Japan ..................................... 55/158 |
| 1435151 | 5/1976 | United Kingdom . |
| 2073654 | 10/1981 | United Kingdom .......... 210/500.39 |
| 2098994 | 12/1982 | United Kingdom . |
| 2101137 | 1/1983 | United Kingdom . |
| 2102333 | 2/1983 | United Kingdom . |
| 2102726 | 2/1983 | United Kingdom . |
| 2104411 | 3/1983 | United Kingdom . |
| 2104832 | 3/1983 | United Kingdom . |
| 2104905 | 3/1983 | United Kingdom . |

*Primary Examiner*—Robert Spitzer

[57] ABSTRACT

Semi-flexible aromatic polyimides, prepared by polycondensation of dianhydrides with diamines having alkyl substituents on all ortho positions to the amine functions, or with mixtures of diamines, some components having substituents on all positions ortho to the amine functions, are disclosed. Membranes formed from this class of polyimides have improved environmental stability and superior gas permeability. The range of gas permeation properties observed allows for the tailoring of membrane material for widely diverse gas separations. The high permeabilities of some gases from multicomponent mixtures is due to the optimization of the molecular free volume in the polymer.

7 Claims, No Drawings

POLYIMIDE GAS SEPARATION MEMBRANES

BACKGROUND OF THE INVENTION

1. Field of the Invention

The present invention relates to certain substituted aromatic polyimide separation membranes particularly useful for separating gases and the process of using them.

2. Prior Art

U.S. Pat. Nos. 3,822,202 and 3,899,309 disclose aromatic polyimide gas separation membranes in which the molecular structure is such that the molecules in the polymer are unable to pack densely, and, therefore, have high gas permeation rates.

U.S. Pat. No. 4,113,628 and U.K. No. 1,435,151 disclose aromatic polyimide gas separation membranes prepared from polyamide acid membranes.

EPO No. 132,221 and EPO No. 141,781 disclose substituted aromatic polymimides and photochemically crosslinked compositions thereof, but not for use as gas separation membranes.

U.S. Pat. Nos. 4,370,290, 4,460,526, 4,474,662, 4,512,893, U.K. No. 2,098,994, U.K. No. 2,101,137, and U.K. No. 2,102,333 disclose microporous aromatic polyimide membranes and the process from which they are prepared.

U.S. Pat. No. 4,486,376 and U.K. No. 2,104,832 disclose gas separation membranes made from a microporous aromatic polyimide support treated with modifying agents.

U.S. Pat. Nos. 4,378,324, 4,440,643, 4,474,858, 4,485,056, 4,528,004, U.K. No. 2,102,726, U.K. No. 2,104,411 and U.K. No. 2,104,905 disclose gas separation membranes made from a microporous aromatic polyimide support coated with an aromatic polyamide acid or aromatic polyimide.

U.S. Pat. No. 4,378,400 and EPO No. 43,265 disclose aromatic polyimide gas separation membranes in which the molecular structure is such that the molecules in the polymer can pack densely.

U.S. Pat. No. 4,578,166 discloses polymers comprising as the essential component a saturated linear polyester or polyamide and copolymerized therewith benzophenone tetracarboxylic groups which are crosslinked by irradiation.

EPO No. 113,574 discloses gas separation membranes made from aromatic polyetherimides.

EPO No. 143,552 discloses gas separation membranes made from a microporous aromatic polyimide support coated with a crosslinked silicone resin film.

EPO No. 0,125,908 discloses aromatic polyimide reverse osmosis membranes.

SUMMARY OF THE INVENTION

U.S. patent application Ser. No. 853,341, filed Apr. 17, 1986 discloses aromatic polyimide gas separation membranes in which the monomeric diamines were rigid and substituted on essentially all of the positions ortho to the amino substituents and the monomeric acid anhydride groups were essentially all attached to rigid aromatic moieties exhibited extremely high permeation rates to gases. The present invention relates to aromatic polyimide gas separation membranes in which some of the before described rigidity is relaxed through use of acid anhydride groups which are essentially attached to less rigid aromatic moieties, structurally less rigid aromatic diamines, and/or unsubstituted diamines. Through controlled reduction of the rigidity, polyimide gas separation membranes which have improved selectivities to gases while still maintaining high permeation to gases are available to effectively separate several combinations of gases.

DETAILED DESCRIPTION

The present invention relates to the discovery that aromatic polyimides derived from diamines having substitutents on all positions ortho to the amine functions or from mixtures of aromatic diamines, some components having substitutents on all positions ortho to the amine functions, exhibit exceptional gas permeability. The selectivity of one gas over other gases in a multicomponent gas mixture can be controlled through choice of the amounts of aromatic diamines having substitutents on all positions ortho to the amine functions and/or the amounts of structurally-nonrigid dianhydrides utilized in the polyimide preparation while maintaining exceptional gas permeability. The high permeability of these membranes is believed to be due to the high molecular free volume in the polymer structure resulting from the rigid nature of the rotationally hindered polymer chains.

Generally, extremely high gas permeation through dense polymeric membranes is found only with low glass transition temperature (Tg) materials, such as silicone rubbers and a few polyolefin polymers. The low Tg materials are generally only useful as the dense separating layer in composite membranes, where a supporting porous membrane substructure provides structural integrity.

High Tg polymeric materials, found in the prior art, generally do not possess extremely high gas permeabilities. Examples reported involve mostly unsubstituted, or partially substituted, polymers subject to forming a close chain packing during fabrication and/or subsequent operation.

U.S. patent application Ser. No. 853,341, filed Apr. 17, 1986 discloses that aromatic polyimide gas separation membranes in which the monomeric diamines were rigid and substituted on essentially all of the positions ortho to the amino substitutents and the monomeric acid anhydride groups were essentially all attached to rigid aromatic moieties exhibited extremely high permeation rates to gases. The present invention, through the controlled addition of less chain rigidity, allows for an improved selectivity while still maintaining high permeability to gases.

The present invention circumvents the above shortcomings and provides exceptionally high permeability dense membranes using high Tg aromatic polyimides containing the repeating unit:

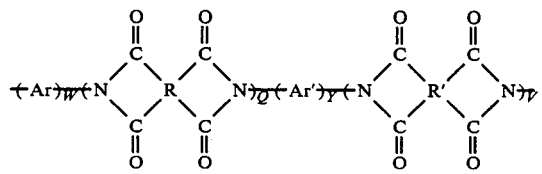

where —Ar— is

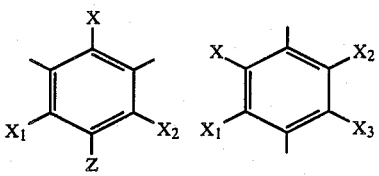

or mixtures thereof,

is

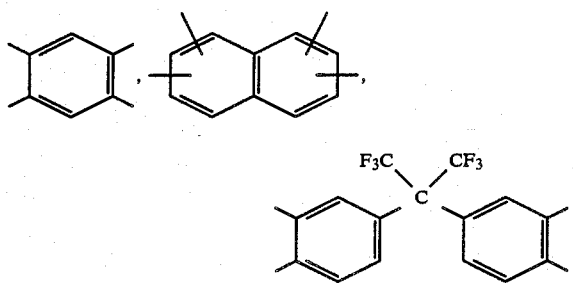

or mixtures thereof, —Ar'— is

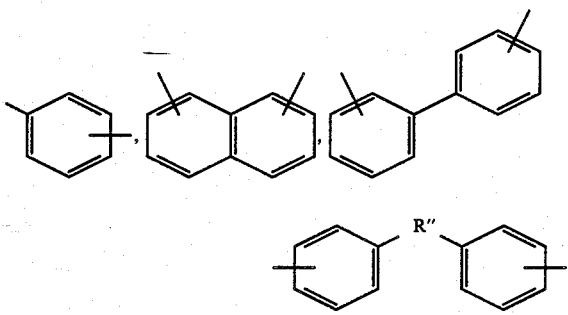

or mixtures thereof,

is

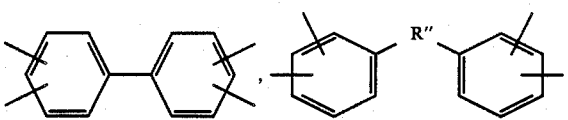

or mixtures thereof, and —R"— is

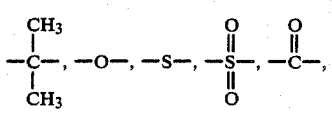

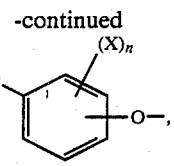

where n=0 to 4, alkylene radicals of 1 to 3 carbon atoms or mixtures thereof,
—X, —$X_1$, —$X_2$, and —$X_3$ are independently alkyl groups having 1 to 6 carbon atoms preferably methyl or ethyl, or aromatic groups of 6 to 13 carbon atoms, Z is —H, —X, —$X_1$, —$X_2$, or —$X_3$
W is 5% to 100%,
Q is 5% to 100%,
Y is 100% minus W
V is 100% minus V
Y plus V is at least 5%, preferably 10 to 50%.

The multiple substitutions ortho to the amines in the above illustrated structures sterically restricts free rotation around the imide linkage. These amines in combination with structurally rigid dianhydrides form rigid polyimides. The incorporation of flexible units such as

for dianhydrides and/or —Ar'— for diamines, allows for the partial relaxation of this rigidity which may lead to lowered molecular free volume in the polymer. This relaxation promotes greater selectivity for the permeation of certain gases from multicomponent gas mixtures through the membrane. At comparable gas selectivities, membranes of the polyimides disclosed herein have generally higher gas permeation rates than other polymers disclosed in the prior art. By varying the amount of relaxation in the polymers of this invention, membranes can be tailored for a wide range of gas separations with exceptional gas productivity.

As preferred examples, some of the fully cyclized polyimides of this invention are soluble in ordinary organic solvents. This is a great advantage for the ease of fabrication of industrially useful membranes. Further, the polyimides reported in this invention range from extremely soluble to insoluble. The soluble polyimides can be solution cast on porous solvent resistant substrates to serve as the dense separating layer of a composite membrane; or they can be solution cast as dense or asymmetric films. Insoluble examples can be cast into membranes from their polyamic acid form and subsequently chemically or thermally cyclized.

The polyimides described in this invention have high inherent thermal stabilities. They are generally stable to 400° C. in air or inert atmospheres. The glass transition temperatures of these polyimides are generally above 300° C. The high temperature characteristics of these polyimides can help to prevent the membrane compaction problems observed in other polymers at even moderate temperatures.

The present invention finds use in recovery of hydrogen in refinery and ammonia plants; separation of carbon monoxide from hydrogen in syngas systems; separation of carbon dioxide or hydrogen sulfide from hydrocarbons; enrichment of oxygen and nitrogen from air for increased combustion or inerting streams, respectively.

EXAMPLES

EXAMPLE 1

To a 50° C. stirred solution of 2,4,6-trimethyl-1,3-phenylenediamine (30.01 g, 0.20 mol) in N-methylpyrrolidone (600 ml) under an inert atmosphere was added 3,3',4,4'-benzophenonetetracarboxylic dianhydride (3.22 g, 0.01 mol). After stirring 0.5 hours, 5,5'-2,2,2-trifluoro-1-(trifluoromethyl)ethylidene-bis-1,3-isobenzofuranedione

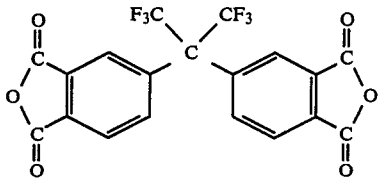

(84.36 g, 0.19 mol), was added in eight portions, the last portion being washed in with 200 ml N-methyl pyrrolidone. The yellow solution was stirred at 50° C. overnight, then a solution of acetic anhydride (75.8 mol, 0.80 mol) and triethylamine (223.9 ml, 0.81 mol) was rapidly added and the resulting reaction solution stirred for 2 hours. The reaction solution was precipitated in methanol. The resulting white solid was collected by filtration, washed with methanol and dried in a vacuum oven at room temperature overnight, at 100° C. for 5 hours and at 250° C. for 2 hours to give 104.37 g white product.

Films were cast from a 15% solution, (based on weight) of the above polymer in N-methyl pyrrolidone onto a glass plate treated with Du Pont TEFLON® dry lubricant at 80° C. with a 15-mil (3.8×10-4 m) knife gap. The films were dried on the plate at 80° C. for 25 minutes, cooled to room temperature, stripped off the plate and dried in a vacuum oven at room temperature overnight and at 120° C. for 4 hours. The films were then tested for mixed gas $O_2/N_2$ (21/79) (mole) permeabilities at 300 psig (2 kPa), 25° C. Results are reported below:

$O_2$ Productivity: 8,900 centiBarrer
$O_2/N_2$ Selectivity: 3.5
and
$O_2$ Productivity: 12,000 centiBarrer
$O_2/N_2$ Selectivity: 3.5

Du Pont TEFLON® dry lubricant contains a fluorocarbon telomer which reduces the adhesion of the membrane to the glass plate.

A centiBarrer is the number of cubic centimeters of gas passed by the membrane at standard temperature and pressure times the thickness of the membrane in centimeters times $10^{-12}$ divided by the permeating area of the membrane in square centimeters times the time in seconds times the partial pressure difference across the membrane in cm Hg, i.e., $$\text{centiBarrer} = 10^{-12} \frac{cm^3 \text{ (STP)} - cm}{cm^2 - sec - cmHg}$$

The above films were consecutively tested for pure gas helium, nitrogen, and carbon dioxide permeabilities at 400 psig (2.75 kPa), 25° C. Results are reported below:

He Productivity: 29,300 centiBarrer
$N_2$ Productivity: 2,270 centiBarrer
$CO_2$ Productivity: 84,600 centiBarrer
He/$N_2$ Selectivity: 13
$CO_2/N_2$ Selectivity: 37.3

The above films were tested for mixed gas $H_2/CH_4$ (50/50) (mole) permeabilities at 400 psig (2.75 kPa), 25° C. Results are reported below:

$H_2$ Productivity: 32,230 centiBarrer
$H_2/CH_4$ Selectivity: 9.5

EXAMPLE 2

To a stirred solution of 2,4,6-trimethyl-1,3-phenylene diamine (30.01 g, 0.20 mol) in N-methyl pyrrolidone (600 ml) under an inert atmosphere was added 3,3',4,4'-benzophenone tetracarboxylic dianhydride (6.44 g, 0.02 mol, washed in with 50 ml N-methyl pyrrolidone). After the solution was stirred for 0.75 hours, 5,5'-2,2,2-trifluoro-1-(trifluoromethyl)ethylidene-bis-1, 3-isobenzofuranedione (79.92 g, 0.18 mol), was added in seven portions, the last portion being washed in with 150 ml N-methyl pyrrolidone. The yellow reaction solution was stirred for 2 hours. A solution of acetic anhydride (75.8 ml, 0.80 mol) and triethylamine (112.9 ml, 0.81 mol) was rapidly added to the reaction solution and the resulting yellow solution stirred for 2 hours. The reaction solution was precipitated in methanol. The resulting white solid was collected by filtration, washed with methanol and dried in a vacuum oven at room temperature overnight, at 100° C. for 3 hours, and at 250° C. for 3 hours to give 119.5 g product.

Films of the above polymer were cast from a 15% polymer solution (based on weight) in N-methyl pyrrolidone onto a glass plate treated with Du Pont TEFLON® dry lubricant at 75° C. with a 15-mil (3.8×10⁻⁴m) knife gap. The films were dried on the plate at 75° C. for 25 minutes, cooled to room temperature, stripped off the plate, and dried in a vacuum oven at room temperature overnight and at 120° C. for 4 hours. The films were then tested for mixed gas $O_2/N_2$ (21/79) (mole) permeabilities at 300 psig (2 k Pa), 25° C. Results are reported below: $O_2$ Productivity: 8,300 centiBarrer $O_2/N_2$ Selectivity: 3.9

The above films were consecutively tested for pure gas helium, nitrogen, and carbon dioxide permeabilities at 400 psig (2.75 k Pa), at 25° C. Results are reported below:

He Productivity: 28,530 centiBarrer
$N_2$ Productivity: 1,800 centiBarrer
$CO_2$ Productivity: 129,000 centiBarrer
He/$N_2$ Selectivity: 16
$CO_2/N_2$ Selectivity: 72

EXAMPLE 3

To a 50° C. stirred solution of 2,4,6-trimethyl-1,3-phenylene diamine (30.01 g, 0.20 mol) in N-methyl pyrrolidone (350 ml) under an inert atmosphere was added 3,3',4,4'-benzophenone tetracarboxylic dianhydride (9.21 g, 0.03 mol). After stirring at 50° C. for 0.3 hours, 5,5'-2,2,2-trifluoro-2-(trifluoromethyl)ethylidene-bis-1,3-isobenzofuranedione (76.1 g, 0.17 mol, added in four portions, last portion washed in with 150 ml N-methyl pyrrolidone) was added and the resulting reaction solution stirred at 50° C. overnight. A solution of acetic anhydride (78.5 ml, 0.80 mol) and triethylamine (112.9 ml, 0.81 mol) was rapidly added and the resulting yellow solution stirred at 50° C. for 2 hours. The reaction solution was precipitated in methanol, the white solid collected by filtration, washed with methanol and dried in a vacuum oven at room temperature overnight, at 100° C. for 3 hours and at 220° C. for 3 hours to give 104.2 g product.

Films of the above polymer were cast from a 15% polymer solution (based on weight) in N-methyl pyrrolidone onto a glass plate treated with Du Pont TEFLON ® dry lubricant at 90° C. with a 15-mil ($3.8 \times 10^{-4}$ m) knife gap. The films were dried on the plate at 90° C. for 25 minutes, cooled to room temperature, and dried in a vacuum oven at room temperature overnight. The films were stripped off the plate and further dried in a vacuum oven at 120° C. for 4 hours. The films were then consecutively tested for pure gas helium, nitrogen, and carbon dioxide permeabilities at 400 psig (2.75 k Pa), 25° C. Results are reported below:

He Productivity: 28,660 centiBarrer
$N_2$ Productivity: 1,540 centiBarrer
$CO_2$ Productivity: 121,650 centiBarrer
He/$N_2$ Selectivity: 19
$CO_2$/$N_2$ Selectivity: 79

The above films were tested for mixed gas $H_2$/$CH_4$ (50/50) (mole) permeabilities at 400 psig (2.75 k Pa), 25° C. Results are reported below:

$H_2$ Productivity: 21,420 centiBarrer
$H_2$/$CH_4$ Selectivity: 14

EXAMPLE 4

To a 50° C. stirred solution of 2,4,6-trimethyl-1,3-phenylene diamine (30.01 g, 0.20 mol) in N-methyl pyrrolidone (350 ml) under an inert atmosphere was added 3,3',4,4'-benzophenone tetracarboxylic dianhydride (16.1 g, 0.05 mol) and the resulting yellow solution stirred for 0.5 hours. 5,5'-2,2,2-trifluoro-1-(trifluoromethyl)ethylidene-bis-1,3-isobenzofuranedione (66.6 g, 0.15 mol, in four portions, last portion washed in with 150 ml N-methyl pyrrolidone) was added to give a light yellow solution. After stirring overnight at 50° C., a solution of acetic anhydride (75.8 ml, 0.80 mol) and triethylamine (112.9 ml, 0.81 mol) was rapidly added and the resulting reaction solution stirred at 50° C. for 2 hours. The reaction solution was precipitated in methanol, the resulting solid collected by filtration, washed with methanol and dried in a vacuum oven at room temperature overnight, at 100° C. for 3 hours and at 200° C. for 3 hours. The product was an off-white solid (102.3 g).

Films of the above polymer were cast from a 15% polymer solution (based on weight) in N-methyl pyrrolidone onto a glass plate treated with Du Pont TEFLON ® dry lubricant at 90° C. with a 15 mil ($3.8 \times 10^{-4}$ m) knife gap. The films were dried on the plate at 90° C. for 25 minutes, cooled to room temperature and dried in a vacuum oven at room temperature overnight. The films were stripped off the plate and further dried in a vacuum oven at 120° C. for 4 hours. The films were then consecutively tested for pure gas helium, nitrogen, and carbon dioxide permeabilities at 400 psig (2.75 k Pa), 25° C. Results are reported below:

He Productivity: 26,520 centiBarrer
$N_2$ Productivity: 2,640 centiBarrer
$CO_2$ Productivity: 90,320 centiBarrer
He/$N_2$ Selectivity: 10
$CO_2$/$N_2$ Selectivity: 34

The above films were tested for mixed gas $H_2$/$CH_4$ (50/50) (mole) permeabilities at 400 psig (2.75 k Pa), 25° C. Results are reported below:

$H_2$ Productivity: 22,080 centiBarrer
$H_2$/$CH_4$ Selectivity: 15

The above films were tested for mixed gas $O_2$/$N_2$ (21/79) (mole) permeabilities at 300 psig (2 k Pa), 25° C. Results are reported below:

$O_2$ Productivity: 5,900 centiBarrer
$O_2$/$N_2$ Selectivity: 4.0

EXAMPLE 5

To a 50° C., stirred solution of 2,4,6-trimethyl-1,3-phenylene diamine (30.01 g, 0.20 mol) in N-methyl pyrrolidone (350 ml) under an inert atmosphere was added 3,3',4,4'-benzophenone tetracarboxylic dianhydride (32.2 g, 0.10 mol). After stirring for 2 hours at 50° C., 5,5'-2,2,2-trifluoro-1-(trifluoromethyl)ethylidene-bis-1,3-isobenzofuranedione (44.4 g, 0.10 mol, added in four portions, last portion washed in with 150 ml N-methyl pyrrolidone) was added to the slightly yellow reaction solution. The reaction solution was allowed to stir at 50° C. overnight. A solution of acetic anhydride (75.8 ml, 0.80 mol) and triethylamine (112.9 ml, 0.81 mol) was added as rapidly as possible to the rapidly stirred reaction solution at 50° C. After stirring for 2 hours, the reaction solution was precipitated in methanol. The resulting white solid was collected by filtration, washed with methanol, and dried in a vacuum oven at room temperature overnight, at 100° C. for 3 hours and at 220° C. for 3 hours to give 96.9 g product.

Films of the above polymer were cast from a 15% polymer solution (based on weight) in N-methyl pyrrolidone onto a glass plate treated with Du Pont TEFLON ® dry lubricant at 90° C. with a 15 mil ($3.8 \times 10^{-4}$) knife gap. The films were dried on the plate at 90° C. for 25 minutes, cooled to room temperature and dried in a vacuum oven at room temperature overnight. The films were stripped off the plate and further dried in a vacuum oven at 120° C. for 4 hours. The films were then consecutively tested for pure gas helium, nitrogen, and carbon dioxide permeabilities at 400 psig (2.75 k Pa), 25° C. Results are reported below:

He Productivity: 17,930 centiBarrer
$N_2$ Productivity: 713 centiBarrer
$CO_2$ Productivity: 46,680 centiBarrer
He/$N_2$ Selectivity: 25
$CO_2$/$N_2$ Selectivity: 66

Films of the above polymer were tested for mixed gas $O_2$/$N_2$ (21/79) (mole) permeabilities at 300 psig (2 k Pa), 25° C. Results are reported below:

$O_2$ Productivity: 3,800 centiBarrer
$O_2$/$N_2$ Selectivity: 4.2

Films of the above polymer were tested for mixed gas $H_2$/$CH_4$ (50/50) (mole) permeabilities at 400 psig (2.75 k Pa), 25° C. Results are reported below:

$H_2$ Productivity: 10,600 centiBarrer
$H_2$/$CH_4$ Selectivity: 20.0

EXAMPLE 6

To a 50° C. stirred solution of 2,3,5,6-tetramethyl-1,4-phenylene diamine (32.86 g, 0.20 mol) in -methyl pyrrolidone (500 ml) under an inert atmosphere was sequentially added 3,3',4,4'-benzophenone tetracarboxylic dianhydride (3.22 g, 0.01 mol) and 5,5'-2,2,2-trifluoro-1-(trifluoromethyl)ethylidene-bis-1,3-isobenzofuranedione (84.36 g, 0.19 mol, added in four portions, last portion washed in with 250 ml N-methyl pyrrolidone) and the resulting yellow solution was stirred overnight at 50° C. A solution of acetic anhydride (75.8 ml, 0.80 mol) and triethylamine (112.9 ml, 0.81 mol) was rapidly added to the reaction solution. After stirring at 50° C.

for 2 hours, the yellow reaction solution was precipitated in methanol. The resulting white solid was collected by filtration, washed with methanol, and dried in a vacuum oven at room temperature overnight, at 100° C. for 4 hours and at 250° C. for 3 hours to give 112 g product.

Films of the above polymer were cast from a 12.5% polymer solution (based on weight) in N-methyl pyrrolidone onto a glass plate treated with Du Pont TEFLON ® dry lubricant at 85° C. with a 15 mil ($3.8 \times 10^{-4}$ m) knife gap. The films were dried on the plate at 85° C. for 25 minutes, cooled to room temperature and dried in a vacuum oven at room temperature overnight. The films were stripped off the plate and further dried in a vacuum oven at 120° C. for 4 hours. The films were then consecutively tested for pure gas helium, nitrogen, and carbon dioxide permeabilities at 400 psig (2.75 k Pa), 25° C. Results are reported below:

He Productivity: 39,600 centiBarrer
$N_2$ Productivity: 3,500 centiBarrer
$CO_2$ Productivity: 230,900 centiBarrer
He/$N_2$ Selectivity: 11
$CO_2$/$N_2$ Selectivity: 66

Films of the above polymer were tested for mixed gas $O_2$/$N_2$ (21/79) (mole) permeabilities at 300 psig (2 k Pa), 25° C. Results are reported below:

$O_2$ Productivity: 14,100 centiBarrer
$O_2$/$N_2$ Selectivity: 3.4

The above films were tested for mixed gas $H_2$/$CH_4$ (50/50) (mole) permeabilities at 400 psig (2.75 k Pa), 25° C. Results are reported below:

$H_2$ Productivity: 33,980 centiBarrer
$H_2$/$CH_4$ Selectivity: 6.8

EXAMPLE 7

To a 50° C. stirred solution of 2,4,6-trimethyl-1-3-phenylene diamine (30.01 g, 0.20 mol) in N-methyl pyrrolidone (500 ml) under an inert atmosphere was sequentially added 3,3',4,4'-benzophenone tetracarboxylic dianhydride (3.22 g, 0.01 mol) and 1,2,4,5-benzenetetracarboxylic dianhydride (41.44 g, 0.19 mol, added in four portions). After stirring overnight at 50° C., a solution of acetic anhydride (75.8 ml, 0.80 mol) and triethylamine (112.9 ml, 0.81 mol) was rapidly added and the resulting orange solution stirred for 2 hours at 50° C. The reaction solution was precipitated in methanol. The resulting orange solid was collected by filtration, washed with methanol, and dried in a vacuum oven at room temperature overnight, at 100° C. for 3 hours and at 250° C. for 3 hours to give 67.1 g product.

Films of the above polymer were cast from a 10% polymer solution (based on weight) in N-methyl pyrrolidone onto a glass plate treated with Du Pont Teflon ® dry lubricant at 80° C. with a 15 mil ($3.8 \times 10^{-4}$ m) knife gap. The films were dried on the plate at 80° C. for 30 minutes, cooled to room temperature and dried in a vacuum oven at room temperature overnight. The films were stripped off the plate and further dried in a vacuum oven at 120° C. for 4 hours. The films were then consecutively tested for pure gas helium, nitrogen, and carbon dioxide permeabilities at 400 psig (2.75 kPa), 25° C. Results are reported below:

He Productivity: 10,800 centiBarrer
$N_2$ Productivity: 814 centiBarrer
$CO_2$ Productivity: 38,140 centiBarrer
He/$N_2$ Selectivity: 13
$CO_2$/$N_2$ Selectivity: 47
and He Productivity: 10,500 centiBarrer
$N_2$ Productivity: 580 centiBarrer
$CO_2$ Productivity: 123,500 centiBarrer
He/$N_2$ Selectivity: 18
$CO_2$/$N_2$ Selectivity: 213

The above films were tested for mixed gas $O_2$/$N_2$ (21/79) (mole) permeabilities at 450 psig 3.1 kPa, 25° C. Results are reported below:

$O_2$ Productivity: 3,100 centiBarrer
$O_2$/$N_2$ Selectivity: 4.1

The above films were tested for mixed gas $H_2$/$CH_4$ (50/50) (mole) permeabilities at 400 psig (2.75 k Pa), 25° C. Results are reported below:

$H_2$ Productivity: 21,960 centiBarrer
$H_2$/$CH_4$ Selectivity: 9

EXAMPLE 8

To a 50° C. stirred solution of 2,4,6-trimethyl-1,3-phenylene diamine (30.01 g, 0.20 mol) in N-methyl pyrrolidone (350 ml) under an inert atmosphere was added 3,3',4,4'-benzophenone tetracarboxylic dianhydride (6.44 g, 0.02 mol) and the resulting solution stirred for 0.75 hours. At 50° C. 1,2,4,5-benzenetetracarboxylic dianhydride (39.3 g, 0.18 mol, added in 4 portions, last portion washed in with 150 ml N-methyl pyrrolidone) was added with stirring and the orange reaction solution stirred overnight at 50° C. A solution of acetic anhydride (75.8 ml, 0.80 mol) and triethylamine (112.9 ml, 0.81 mol) was added as fast as possible to the rapidly stirring 50° C. reaction solution. A solid precipitated, but slowly went back into solution. After stirring at 50° C. for 2 hours, the orange reaction solution was precipitated in methanol. The resulting yellow solid was collected by filtration, washed with methanol and dried in a vacuum oven at room temperature overnight, at 100° C. for 3 hours and at 230° C. for 3 hours. This gave 68.5 g product as a yellow-orange solid.

Films of the above polymer were cast from a 2.5% polymer solution (based on weight) in N-methyl pyrrolidone onto a glass plate treated with Du Pont Teflon ® dry lubricant at 90° C. with a 15 mil ($3.8 \times 10^{-4}$ m) knife gap. The films were dried on the plate at 90° C. for 25 minutes, cooled to room temperature, and dried in a vacuum oven at room temperature overnight. The films were stripped off the plate and further dried in a vacuum oven at 120° C. for 4 hours. The films were then consecutively tested for pure gas helium, nitrogen, and carbon dioxide permeabilities at 400 psig (2.75 kPa), 25° C. Results are reported below:

He Productivity: 22,730 centiBarrer
$N_2$ Productivity: 1,400 centiBarrer
$CO_2$ Productivity: 118,600 centiBarrer
He/$N_2$ Selectivity: 16.2
$CO_2$/$N_2$ Selectivity: 85

The above films were tested for mixed gas $O_2$/$N_2$ (21/79) (mole) permeabilities at 300 psig (2 kPa), 25° C. Results are reported below:

$O_2$ Productivity: 7,900 centiBarrer
$O_2$/$N_2$ Selectivity: 3.9

The above films were tested for mixed gas $H_2$/$CH_4$ (50/50) (mole) permeabilities at 400 psig (2.75 k Pa), 25° C. Results are reported below:

$H_2$ Productivity: 23,600 centiBarrer
$H_2$/$CH_4$ Selectivity: 9.2

EXAMPLE 9

To a 50° C. stirred solution of 2,4,6-trimethyl-1,3-phenylene diamine (30.01 g, 0.20 mol) in N-methyl pyrrolidone (350 ml) under an inert atmosphere was added 3,3',4,4'-benzophenone tetracarboxylic dianhydride (9.21 g, 0.029 mol). After the yellow solution had stirred for 0.50 hours, 1,2,4,5-benzenetetracarboxylic dianhydride (37.4 g, 0.17 mol, added in four portions, last portion washed in with 150 ml N-methyl pyrrolidone) was added and the resulting orange reaction solution was stirred at 50° C. overnight. A solution of acetic anhydride (75.8 ml, 0.80 mol) and triethylamine (112.9 ml, 0.81 mol) was added as fast as possible to the rapidly stirring 50° C. reaction solution. A solid precipitated, but went back into solution after 3 minutes. The resulting orange reaction solution was stirred at 50° C. for 2 hours and then precipitated in methanol. The off-white solid was collected by filtration, washed with methanol and dried in a vacuum oven at room temperature overnight, at 100° C. for 3 hours and at 220° C. for 3 hours to give 69.4 g of an orange product.

Films of the above polymer were cast from a 15% polymer solution (based on weight) in N-methyl pyrrolidone onto a glass plate treated with Du Pont TEFLON ® dry lubricant at 90° C. with a 15 mil ($3.8 \times 10^{-4}$ m) knife gap. The films were dried on the plate at 90° C. for 25 minutes, cooled to room temperature and dried in a vacuum oven at room temperature overnight. The films were stripped off the plate and further dried in a vacuum oven at 120° C. for 4 hours. The films were then tested for mixed gas $H_2/CH_4$ (50/50) (mole) permeabilities at 400 psig (2.75 k Pa), 25° C. Results are reported below:

$H_2$ Productivity: 24,050 centiBarrer
$H_2/CH_4$ Selectivity: 8

The above films were consecutively tested for pure gas helium, nitrogen, and carbon dioxide permeabilities at 400 psig (2.75 kPa), 25° C. The results are reported below:

He Productivity: 28,800 centiBarrer
$N_2$ Productivity: 2,080 centiBarrer
$CO_2$ Productivity: 163,600 centiBarrer
He/$N_2$ Selectivity: 14
$CO_2/N_2$ Selectivity: 79

EXAMPLE 10

To a stirred solution of 2,4,6-trimethyl-1,3-phenylene diamine (30.05 g, 0.20 mol) in N-methyl pyrrolidone (450 ml) at room temperature under a nitrogen atmosphere was added 3,3',4,4'-benzophenone tetracarboxylic dianhydride (16.11 g, 0.05 mol, washed in with N-methyl pyrrolidone (50 ml)). After stirring at room temperature for 0.5 hours, 1,2,4,5-benzenetetracarboxylic dianhydride (32.72 g, 0.15 mol, washed in with N-methyl pyrrolidone (100 ml)) was added and the yellow solution allowed to stir for 2 hours. A solution of acetic anhydride (75.84 ml, 0.80 mol) and triethylamine (112.94 ml, 0.80 mol) was added as fast as possible with fast stirring. A white solid precipitated, but went back into solution to form a viscous golden-yellow solution. After stirring 2 hours, the reaction solution was precipitated in methanol, the resulting off-white solid collected by filtration, and dried in vacuo overnight at room temperature, for 4 hours at 100° C., and for 3 hours at 240° C. to give product. (69.3 g).

Films of the above polymer were cast from a 15% polymer solution (based on weight) in N-methyl pyrrolidone onto a glass plate treated with Du Pont TEFLON ® dry lubricant at 80° C. with a 15 mil ($3.8 \times 10^{-4}$ m) knife gap. The films were dried on the plate at 80° C. for 25 minutes, cooled to room temperature and dried in a vacuum oven at room temperature overnight. The films were stripped off the plate and further dried in a vacuum oven at 120° C. for 4 hours. The films were then tested for mixed gas $H_2/CH_4$ (50/50) (mole) permeabilities at 400 psig (2.75 k Pa), 25° C. Results are reported below:

$H_2$ Productivity: 10,170 centiBarrer
$H_2/CH_4$ Selectivity: 20.4

The above films were tested for mixed gas $CO_2/CH_4$ (50/50) (mole) permeabilities at 245 psig (1.7 k Pa), 25° C. Results are reported below:

$CO_2$ Productivity: 9,517 centiBarrer
$CO_2/CH_4$ Selectivity: 30

The above films were consecutively tested for pure gas helium, nitrogen, and carbon dioxide permeabilities at 400 psig (2.75 kPa), 25° C. The results are reported below:

He Productivity: 7,450 centiBarrer
$N_2$ Productivity: 200 centiBarrer
$CO_2$ Productivity: 37,700 centiBarrer
He/$N_2$ Selectivity: 37
$CO_2/N_2$ Selectivity: 187

EXAMPLE 11

To a stirred solution of 2,4,6-trimethyl-1,3-phenylene diamine (30.05 g, 0.20 mol) in N-methyl pyrrolidone (500 ml) was added 3,3',4,4'-benzophenone tetracarboxylic dianhydride (32.22 g, 0.10 mol, washed in with 100 ml N-methyl pyrrolidone) at room temperature under an inert atmosphere. The slightly yellow solution was stirred for 0.5 hours and then 1,2,4,5-benzenetetracarboxylic dianhydride (21.8 g, 0.10 mol, washed in with N-methyl pyrrolidone (100 ml)) was added. The yellow solution turned more viscous and was stirred for 2 hours at room temperature. A solution of acetic anhydride (75.84 ml, 0.80 mol) and triethylamine (112.94 ml, 0.80 mol) was rapidly added with fast stirring, causing a small amount of white solid to precipitate. As the solid redissolved, the solution became viscous and orange-yellow. After stirring for 2 hours, the reaction solution was precipiated from methanol, the white solid collected by filtration, and the reaction product washed with methanol. The solid was dried in vacuo overnight at room temperature, 3 hours at 100° C. and 3 hours at 220° C. to give 73.6 g product.

Films of the above polymer were cast from a polymer solution (based on weight) in N-methyl pyrrolidone onto a glass plate treated with Du Pont TEFLON ® dry lubricant at 75° C. with a 15 mil ($3.8 \times 10^{-4}$ m) knife gap. The films were dried on the plate at 75° C. for 25 minutes, then at room temperature for 30 minutes. The films were stripped off the plate and dried at room temperature in a vacuum oven for 4 hours and at 120° C. in a vacuum oven for 4 hours. The films were oonsecutively tested for pure gas helium, nitrogen, and carbon dioxide permeabilities at 400 psig (2.75 KPa), 25° C. Results are reported below:

He Productivity: 6,830 centiBarrer
$N_2$ Productivity: 71 centiBarrer
$CO_2$ Productivity: 12,140 centiBarrer
He/$N_2$ Selectivity: 96
$CO_2/N_2$ Selectivity: 171 and

He Productivity: 7,500 centiBarrer
$N_2$ Productivity: 55 centiBarrer
$CO_2$ Productivity: 17,300 centiBarrer
He/$N_2$ Selectivity: 136
$CO_2/N_2$ Selectivity: 315

The above films were tested for mixed gas $H_2/CH_4$ (50/50) (mole) permeabilities at 400 psig (2.75 kPa), 25° C. The results are reported below:

$H_2$ Productivity: 6,590 centiBarrer
$H_2/CH_4$ Selectivity: 31

EXAMPLE 12

To a stirred, 50° C. solution of 2,4,6-trimethyl-1,3-phenylene diamine (30.01 g, 0.20 mol) in N-methyl pyrrolidone (350 ml) under an inert atmosphere was added 3,3',4,4'-benzophenone tetracraboxylic dianhydride (48.3 g, 0.15 mol). After stirring for 0.5 hours, 1,2,4,5-benzenetetracarboxylic dianhydride (10.9 g, 0.05 mol, washed in with 150 ml N-methyl pyrrolidone) was added and the resulting orange solution allowed to stir at 50° C. overnight. A solution of acetic anhydride (75.8 ml, 0.80 mol) and triethylamine (112.9 ml, 0.81 mol) was added as rapidly as possible to the rapidly stirring reaction solution and the resulting orange solution was stirred at 50° C. for 2 hours. The reaction solution was precipitated in methanol, the off-white solid collected by filtration, washed with methanol and dried in a vacuum oven at room temperature overnight, at 100° C. for 3 hours and at 220° C. for 3 hours. The off-white product was collected in a 89.8 g yield.

Films of the above polymer were cast from a 12.5% polymer solution (based on weight) in N-methyl pyrrolidone onto a glass plate treated with Du Pont TEFLON® dry lubricant at 90° C. with a 15 mil ($3.8 \times 10^{-4}$ m) knife gap. The films were dried on the plate at 90° C. for 25 minutes, cooled to room temperature and dried in a vacuum oven at room temperature overnight. The films were stripped off the plate and further dried in a vacuum oven at 120° C. for 4 hours. The films were then consecutively tested for pure gas helium, nitrogen, and carbon dioxide permeabilities at 400 psig (2.75 kPa), 25° C. Results are reported below:

He Productivity: 3,680 centiBarrer
$N_2$ Productivity: 108 centiBarrer
$CO_2$ Productivity: 22,010 centiBarrer
$He/N_2$ Selectivity: 34
$CO_2/N_2$ Selectivity: 204

The above films were tested for mixed gas $H_2/CH_4$ (50/50) (mole) permeabilities at 400 psig (2.75 kPa), 25° C. The results are reported below:

$H_2$ Productivity: 6,850 centiBarrer
$H_2/CH_4$ Selectivity: 28

EXAMPLE 13

To a stirred solution of 2,4,6-trimethyl-1,3-phenylene diamine (30.05 g, 0.2 mol) in N-methyl pyrrolidone (450 ml) was added 3,3',4,4'-benzophenone tetracarboxylic dianhydride (9.21 g, 0.029 mol) at 50° C. under an inert atmosphere. After stirring 30 minutes, 5,5'-2,2,2-trifluoro-1-(trifluoromethyl)ethylidene-bis-1,3-isobenzofuranedione (19.3 g, 0.043 mol, in three portions) was added. The yellow solution was stirred at 50° C. for 15 minutes after which 1,2,4,5-benzenetetracarboxylic dianhydride (28.04 g, 0.129 mol, in three portions, last portion washed in with N-methyl pyrrolidone (300 ml)) was added. The resulting orange-yellow reaction solution was stirred at 50° C. under an inert atmosphere overnight. A solution of acetic anhydride (75.8 ml, 0.80 mol) and triethylamine (112.9 ml, 0.80 mol) was added as quickly as possible to the rapidly stirred reaction solution at 50° C. and the resulting orange reaction solution was stirred for 2 hours at 50° C. The reaction solution was precipitated in methanol, the resulting white solid collected by filtration, and washed with additional methanol. The white solid was dried in a vacuum oven at ambient temperature overnight, at 120° C. for 4 hours and at 260° C. for 4 hours to give 77 g product.

Films of the above polymer were cast from a 15% polymer solution (based on weight) in N-methyl pyrrolidone onto a glass plate treated with Du Pont TEFLON® dry lubricant at 90° C. with a 15 mil ($3.8 \times 10^{-4}$ m) knife gap. The films were dried on the plate at 90° C. for 25 minutes, cooled to room temperature and dried in a vacuum oven at room temperature overnight. The films were then stripped off the plate and further dried in a vacuum oven at 120° C. for 4 hours. The films were consecutively tested for pure gas helium, nitrogen and carbon dioxide permeabilities at 400 psig (2.75 kPa), 25° C. Results are reported below:

He Productivity: 22,600 centiBarrer
$N_2$ Productivity: 600 centiBarrer
$CO_2$ Productivity: 91,000 centiBarrer
$He/N_2$ Selectivity: 38
$CO_2/N_2$ Selectivity: 152

The above films were tested for mixed gas $H_2/CH_4$ (50/50) (mole) permeabilities at 400 psig (2.75 kPa), 25° C. The results are reported below:

$H_2$ Productivity: 25,000 centiBarrer
$H_2/CH_4$ Selectivity: 6

EXAMPLE 14

To a 50° C. stirred solution of 2,4,6-trimethyl-1,3-phenylene diamine (28.54 g, 0.19 mol) and 1,3-phenylene diamine (1.08 g, 0.01 mol) in dimethylsulfoxide (500 ml) under an inert atmosphere was portionwise added 5,5'-2,2,2-trifluoro-1-(trifluoromethyl)ethylidene-bis-1,3isobenzofuranedione (88.8 g, 0.20 mol, added in eight portions, last portion washed in with dimethyl sulfoxide (250 ml)). After stirring overnight at 50° C., a solution of acetic anhydride (75.8 ml, 0.80 mol) and triethylamine (112.9 ml, 0.81 mol) was rapidly added to the reaction solution and the resulting yellow solution stirred at 50° C. for 2 hours. The reaction solution was precipitated in methanol, and the resulting white solid was collected by filtration, washed with methanol, and dried in a vacuum oven at room temperature overnight, at 100° C. for 4 hours and at 200° C. for 4 hour to give 106.7 g product.

Films of the above polymer were cast from a 10% polymer solution (based on weight) in N-methyl pyrrolidone onto a glass plate treated with Du Pont TEFLON® dry lubricant at 85° C. with a 15 mil ($3.8 \times 10^{-4}$ m) knife gap. The films were dried on the plate at 85° C. for 30 minutes, cooled to room temperature and dried in a vacuum oven at room temperature overnight. The films were stripped off the plate and further dried in a vacuum oven at 120° C. for 4 hours. The films were then consecutively tested for pure gas helium, nitrogen, and carbon dioxide permeabilities at 400 psig (2.75 kPa), 25° C. Results are reported below:

He Productivity: 64,370 centiBarrer
$N_2$ Productivity: 4,480 centiBarrer
$CO_2$ Productivity: 139,300 centiBarrer
$He/N_2$ Selectivity: 14
$CO_2/N_2$ Selectivity: 31

The above films were tested for mixed gas $O_2/N_2$ (21/79) (mole) permeabilities at 300 psig, 25° C. The results are reported below:

$O_2$ Productivity: 14,900 centiBarrer
$O_2/N_2$ Selectivity: 3.6

EXAMPLE 15

To a 50° C. stirred solution of 2,4,6-trimethyl-1,3-phenylene diamine (27.04 g, 0.18 mol) and 1,3-phenylene diamine (2.16 g, 0.02 mol) in dimethylsulfoxide (600 ml) under an inert atmosphere was portionwise added 5,5'-2,2,2-trifluoro-1-(trifluoromethyl)ethylidene-bis-1,3-isobenzofuranedione (88.8 g, 0.20 mol, added in four portions, last portion washed in with 150 ml dimethylsulfoxide) and the resulting yellow solution was stirred at 50° C. overnight. A solution of acetic anhydride (75.8 ml, 0.80 mol) and triethylamine (112.9 ml, 0.81 mol) was rapidly added to the reaction solution. After stirring at 50° C. for 2 hours, the reaction solution was precipitated in methanol. The collected by filtration, resulting white solid was washed with methanol, and dried in a vacuum oven at room temperature overnight, at 100° C. for 4 hours and at 240° C. for 3 hours to give 109.3 g product.

Films of the above polymer were cast from a 15% polymer solution (based on weight) in N-methyl pyrrolidone onto a glass plate treated with Du Pont TEFLON® dry lubricant at 85° C. with a 15 mil ($3.8 \times 10^{-4}$ m) knife gap. The films were dried on the plate at 85° C. for 30 minutes, cooled to room temperature and dried in a vacuum oven at room temperature, and then dried in a vacuum oven overnight. The films were stripped off the plates and dried in a vacuum oven at 20° C. for four hours. The films were tested for mixed gas $O_2/N_2$ (21/79) (mole) permeabilities at 300 psig (2 kPa), 25° C. Results are reported below:

$O_2$ Productivity: 8,300 centiBarrer
$O_2/N_2$ Selectivity: 3.9

The above films were consecutively tested from pure gas helium, nitrogen, and carbon dioxide permeabilities at 400 psig (2.75 kPa), 25° C. Results are reported below:

He Productivity: 47,800 centiBarrer
$N_2$ Productivity: 3,380 centiBarrer
$CO_2$ Productivity: 74,000 centiBarrer
He/$N_2$ Selectivity: 13
$CO_2/N_2$ Selectivity: 19 and

He Productivity: 32,530 centiBarrer
$N_2$ Productivity: 2,000 centiBarrer
$CO_2$ Productivity: 113,200 centiBarrer
He/$N_2$ Selectivity: 16
$CO_2/N_2$ Selectivity: 57

EXAMPLE 16

To a 50° C. stirred solution of 2,4,6-trimethyl-1,3-phenylene diamine (25.8 g, 0.17 mol) and 1,3-phenylene diamine (3.1 g, 0.03 mol) in N-methyl pyrrolidone (350 ml) under an inert atmosphere was portionwise added 5,5'-2,2,2-trifluoro-1-(trifluoromethyl)-ethylidene-bis-1,3-isobenzofuranedione (88.8 g, 0.20 mol, added in four portions, last portion washed in with 150 ml N-methyl pyrrolidone). After stirring overnight at 50° C., a solution of acetic anhydride (75.8 ml, 0.80 mol) and triethylamine (112.9 ml, 0.81 mol) was rapidly added and the resulting reaction solution was stirred at 50° C. for 2 hours. The yellow reaction solution was precipitated in methanol and the resulting white solid collected by filtration, washed with methanol and dried in a vacuum oven at room temperature overnight, at 100° C. for 3 hours and at 200° C. for 3 hours to give 97.0 g product.

Films of the above polymer were cast from a 15% polymer solution (based on weight) in N-methyl pyrrolidone onto a glass plate treated with Du Pont TEFLON® dry lubricant at 90° C. with a 15 mil ($3.8 \times 10^{-4}$ m) knife gap. The films were dried on the plate at 90° C. for 25 minutes, cooled to room temperature and then dried in a vacuum oven at room temperature overnight. The films were then stripped off the plate and further dried in a vacuum oven at 120° C. for four hours. The films were consecutively tested for pure gas helium, nitrogen, and carbon dioxide permeabilities at 400 psig (2.75 kPa), 25° C. Results are reported below:

He Productivity: 7,240 centiBarrer
$N_2$ Productivity: 154 centiBarrer
$CO_2$ Productivity: 10,541 centiBarrer
He/$N_2$ Selectivity: 47
$CO_2/N_2$ Selectivity: 69

The above films were tested for mixed gas $H_2/CH_4$ (50/50) (mole) permeabilities at 400 psig (2.75 kPa), 25° C. Results are reported below:

$H_2$ Productivity: 5,780 centiBarrer
$H_2/CH_4$ Selectivity: 49

EXAMPLE 17

To a 50° C. stirred solution of 2,4,6-trimethyl-1,3-phenylene diamine (24.04 g, 0.16 mol) and 1,3-phenylene diamine (4.33 g, 0.04 mol) in N-methyl pyrrolidone (350 ml) under an inert atmosphere was portionwise added 5,5'-2,2,2-trifluoro-1-(trifluoromethyl)ethylidene-bis-1,3-isobenzofuranedione (88.8 g, 0.20 mol, added in four portions, last portion washed in with 150 ml N-methyl pyrrolidone). After stirring overnight at 50° C., a solution of acetic anhydride (75.8 ml, 0.80 mol) and triethylamine (112.9 ml, 0.81 mol) was rapidly added and the resulting yellow reaction solution was stirred at 50° C. for 2 hours. The reaction solution was precipitated in methanol and the resulting white solid collected by filtration, washed with methanol and dried in a vacuum oven at room temperature overnight, at 100° C. for 3 hours and at 240° C. for 4 hours to give 106.5 g product.

Films of the above polymer were cast from a 15% polymer solution (based on weight) in N-methyl pyrrolidone onto a glass plate treated with Du Pont TEFLON® dry lubricant at 90° C. with a 15 mil ($3.8 \times 10^{-4}$ m) knife gap. The films were dried on the plate at 90° C. for 30 minutes, cooled to room temperature and then dried in a vacuum oven overnight. The films were then stripped off the plate and further dried in a vacuum oven at 120° C. for four hours. The films were then tested for mixed gas $O_2/N_2$ (21/79) (mole) permeabilities at 400 psig (2.75 kPa), 25° C. Results are reported below:

$O_2$ Productivity: 4,300 centiBarrer
$O_2/N_2$ Selectivity: 4.1

The above films were consecutively tested for pure gas helium, nitrogen, and carbon dioxide permeabilities at 400 psig (2.75 kPa), 25° C. Results are reported below:

He Productivity: 22,300 centiBarrer
$N_2$ Productivity: 1,080 centiBarrer
$CO_2$ Productivity: 67,000 centiBarrer
He/$N_2$ Selectivity: 21
$CO_2/N_2$ Selectivity: 62

The above films were tested for mixed gas $H_2/CH_4$ (50/50) (mole) permeabilities at 400 psig (2.75 kPa), 25° C. Results are reported below:

$H_2$ Productivity: 14,600 centiBarrer
$H_2CH_4$ Selectivity: 23

EXAMPLE 18

To a 50° C. stirred solution of 2,4,6-trimethyl-1,3-phenylene diamine (15.04 g, 0.10 mol) and 1,3-phenylene diamine (10.8 g, 0.10 mol) in N-methyl pyrrolidone (350 ml) under an inert atmosphere was portionwise added 5,5'-2,2,2-trifluoro-1-(trifluoromethyl)ethylidene-bis-1,3-isobenzofuranedione (88.8 g, 0.20 mole, added in four portions, last portion washed in with 150 ml N-methyl pyrrolidone). After stirring overnight at 50° C., a solution of acetic anhydride (75.8 ml, 0.80 mol) and triethylamine (112.9 ml, 0.81 mol) was rapidly added and the resulting reaction solution was stirred at 50° C. for 2 hours. The slightly yellow reaction solution was precipitated in methanol and the resulting white solid collected by filtration, washed with methanol and dried in a vacuum oven at room temperature overnight, at 100° C. for 3 hours and at 220° C. for 4 hours. The product was a white solid (106.8 g).

Films of the above polymer were cast from a 15% polymer solution (based on weight) in N-methyl pyrrolidone onto a glass plate treated with Du Pont TEFLON® dry lubricant at 90° C. with a 15 mil ($3.8 \times 10^{-4}$ m) knife gap. The films were dried on the plate at 90°0 C. for 25 minutes, cooled to room temperature and then dried in a vacuum oven at room temperature overnight. The films were then stripped off the plate and further dried in a vacuum oven at 120° C. for four hours. The films were then consecutively tested for pure gas helium, nitrogen, and carbon dioxide permeabilities at 400 psig (2.75 kPa), 25° C. Results are reported below:

He Productivity: 8,300 centiBarrer
$N_2$ Productivity: 775 centiBarrer
$CO_2$ Productivity: 25,000 centiBarrer
He/$N_2$ Selectivity: 11
$CO_2$/$N_2$ Selectivity: 32

The above films were tested for mixed gas $H_2$/$CH_4$ (50/50) (mole) permeabilities at 400 psig (2.75 kPa), 25° C. Results are reported below:

$H_2$ Productivity: 17,840 centiBarrer
$H_2$/$CH_4$ Selectivity: 15

The above films were tested for mixed gas $O_2$/$N_2$ (21/79) (mole) permeabilities at 300 psig (2 kPa), 25° C. Results are reported below:

$O_2$ Productivity: 42,200 centiBarrer
$O_2$/$N_2$ Selectivity: 3.9

EXAMPLE 19

To a 50° C. stirred solution of 2,4,6-trimethyl-1,3-phenylene diamine (27.04 g, 0.18 mol) and 4-aminophenyl sulfone (4.97 g, 0.02 mol) in dimethylsulfoxide (600 ml) under an inert atmosphere was portionwise added 5,5'-2,2,2-trifluoro-1-(trifluoromethyl)ethylidene-bis-1,3-isobenzofuranedione (88.8 g, 0.20 mol, added in five portions, last portion washed in with 150 ml dimethyl sulfoxide). After stirring overnight at 50° C., a solution of acetic anhydride (75.8 ml, 0.80 mol) and triethylamine (112.9 ml, 0.81 mol) was rapidly added. The yellow reaction solution was stirred at 50° C. for 2 hours and then precipitated in methanol. The resulting white solid was collected by filtration, washed with methanol, and dried in a vacuum oven at room temperature overnight, at 100° C. for 3 hours and at 250° C. for 4 hours to give 109.0 g product.

Films of the above polymer were cast from a 15% polymer solution (based on weight) in N-methyl pyrrolidone onto a glass plate treated with Du Pont TEFLON® dry lubricant at 85° C. with a 15 mil ($3.8 \times 10^{-4}$ m) knife gap. The films were dried on the plate at 85°0 C. for 25 minutes, cooled to room temperature and then dried in a vacuum oven at room temperature overnight. The films were then stripped off the plate and further dried in a vacuum oven at 120° C. for four hours. The films were then consecutively tested for mixed gas $O_2$/$N_2$ (21/79) (mole) permeabilities at 300 psig (2 kPa), 25° C. Results are reported below:

$O_2$ Productivity: 7,800 centiBarrer
$O_2$/$N_2$ Selectivity: 3.9

The above films were consecutively tested for pure gas helium, nitrogen, and carbon dioxide permeabilities at 400 psig (2.75 kPa), 25° C. Results are reported below:

He Productivity: 26,300 centiBarrer
$N_2$ Productivity: 1,180 centiBarrer
$CO_2$ Productivity: 126,700 centiBarrer
He/$N_2$ Selectivity: 22
$CO_2$/$N_2$ Selectivity: 107

EXAMPLE 20

To a 50° C. stirred solution of 2,4,6-trimethyl-1,3-phenylene diamine (27.04 g, 0.18 mol) and 1,5-naphthalene diamine (3.16 g, 0.02 mol) in dimethylsulfoxide (600 ml) under an inert atmosphere was portionwise added 5,5'-2,2,2-trifluoro-1-(trifluoromethyl)ethylidene-bis-1,3-isobenzofuranedione (88.8 g, 0.20 mol, added in six portions, last portion washed in with 150 ml dimethyl sulfoxide). After stirring overnight at 50° C., a solution of acetic anhydride (75.8 ml, 0.80 mol) and triethylamine (112.9 ml, 0.81 mol) was rapidly added to form a golden solution. The reaction solution was stirred at 50° C. for 2 hours and then precipitated in methanol. The resulting off-white solid was collected by filtration, washed with methanol, and dried in a vacuum oven at room temperature overnight, at 100° C. for 4 hours and at 240° C. for 3 hours to give 104.6 g product.

Films of the above polymer were cast from a 15% polymer solution (based on weight) in N-methyl pyrrolidone onto a glass plate treated with Du Pont TEFLON® dry lubricant at 85° C. with a 15 mil ($3.8 \times 10^{-4}$ m) knife gap. The films were dried on the plate at 85° C. for 25 minutes, cooled to room temperature and then dried in a vacuum oven at room temperature overnight. The films were then stripped off the plate and further dried in a vacuum oven at 120° C. for four hours. The films were then tested for mixed gas $O_2$/$N_2$ (21/79) (mole) permeabilities at 300 psig (2 kPa), 25° C. Results are reported below:

$O_2$ Productivity: 10,000 centiBarrer
$O_2$/$N_2$ Selectivity: 3.6
and
$O_2$ Productivity: 11,000 centiBarrer
$O_2$/$N_2$ Selectivity: 3.5

The above films were consecutively tested for pure gas helium, nitrogen, and carbon dioxide permeabilities at 400 psig (2.75 kPa), 25° C. Results are reported below:

He Productivity: 34,000 centiBarrer
$N_2$ Productivity: 2,450 centiBarrer
$CO_2$ Productivity: 125,100 centiBarrer
He/$N_2$ Selectivity: 14
$CO_2$/$N_2$ Selectivity: 51

EXAMPLE 21

To a 50° C. stirred solution of 2,3,5,6-tetramethyl-1,4-phenylene diamine (29.57 g, 0.18 mol) in dimethylsulfoxide (600 ml) under an inert atmosphere at room temperature was added 5,5'-2,2,2-trifluoro-1-(trifluoromethyl)ethylidene-bis-1,3-isobenzofuranedione (88.8 g, 0.20 mol) and the resulting solution was stirred at 50° C. for 6 hours. The reaction solution was cooled to room temperature and 1,5-naphthalene diamine (3.16 g, 0.02 mol) was added and the resulting reaction solution stirred at room temperature overnight. A solution of acetic anhydride (75.8 ml, 0.80 mol) and triethylamine (112.9 ml, 0.81 mol) was rapidly added and the yellow reaction solution stirred for 2 hours. The reaction solution was precipitated in methanol. The resulting white solid was collected by filtration, washed with methanol, and dried in a vacuum oven at room temperature overnight, at 100° for 3 hours, and at 200° C. for 4 hours to give 112.3 g product.

Films of the above polymer were cast from a 15% polymer solution (based on weight) in N-methyl pyrrolidone onto a glass plate treated with Du Pont TEFLON® dry lubricant at 90° C. with a 15 mil ($3.8 \times 10^{-4}$ m) knife gap. The films were dried on the plate at 90° C. for 25 minutes, cooled to room temperature and dried in a vacuum oven at room temperature overnight. The films were stripped off the plate and further dried in a vacuum oven at 120° C. for 4 hours. The films were then consecutively tested for pure gas helium, nitrogen, and carbon dioxide permeabilities at 400 psig (2.75 kPa), 25° C. Results are reported below:

He Productivity: 35,630 centiBarrer
$N_2$ Productivity: 2,380 centiBarrer
$CO_2$ Productivity: 98,900 centiBarrer
He/$N_2$ Selectivity: 15
$CO_2$/$N_2$ Selectivity: 42

EXAMPLE 22

Asymmetric membranes were cast from a 20% by weight solution of the polymer of Example 1 in a N-methyl pyrrolidone:water (97:3) solution (weight) onto a glass plate at 50° C. with a 15-mil ($3.8 \times 10^{-4}$ m) knife gap. The films were dried on the plate at 50° C. for 0.5 minutes and then precipitated in deionized water for 24 hours, they were placed in isopropanol. The isopropanol was replaced with fresh isopropanol after 6 hours. After 24 hours in isopropanol the membranes were dried in a vacuum oven at room temperature overnight. The membranes were treated with a 10% SYLGARD® 184 solution in FREON® 113 (1,1,2-trichloro-1,2,2-trifluoroethane) (weight/volume) and dried in a vaccum oven at 50° C. for 16 hours. The asymmetric membranes were then consecutively tested for pure gas helium, nitrogen, and carbon dioxide permeabilities at 100 psig (0.69 kPa), 25° C. The results are reported below:

He Productivity: 480 GPU
$N_2$ Productivity: 41 GPU
$CO_2$ Productivity: 1,122 GPU
He/$N_2$ Selectivity: 12
$CO_2$/$N_2$ Selectivity: 27

A Gas Permeation Unit (GPU) is the cubic centimeters of gas passed by the membrane at standard temperature and pressure times $10^{-6}$ divided by the area of the membrane in square centimeters times the time in seconds times the pressure on the side of the membrane in cm Hg, i.e., $$GPU = \frac{10^{-6} \times cm^3 (STP)}{cm^2\text{-sec(cm Hg)}}$$

Dow Corning SYLGARD® 184 is an elastomeric silicone material which thermally cures to a crosslinked silicone material. In the present usage it serves as a sealing agent for membrane imperfections.

The above asymmetric membranes were tested for mixed gas $O_2$/$N_2$ (21/79) (mole) permeabilities at 100 psig (0.69 kPa), 23° C. The results are reported below:

$O_2$ Productivity: 170 GPU
$O_2$/$N_2$ Selectivity: 3.8

EXAMPLE 23

Asymmetric membranes were cast from a 20% by weight solution of the polymer of Example 1 in a N-methyl pyrrolidone:water (97:3) solution (weight) onto a glass plate at 50° C. with a 15-mil ($3.8 \times 10^{-4}$ m) knife gap. The films were dried on the plate at 50° C. for 1.0 minutes and then precipitated in deionized water. After the resulting white asymmetric membranes had sat in deionized water for 24 hours, they were placed in isopropanol. The isopropanol was replaced with fresh isopropanol after 6 hours. After 24 hours in isopropanol the membranes were dried in a vacuum oven at room temperature overnight. The membranes were treated with a 10% SYLGARD® 184 solution in FREON® 113 (weight/volume) and dried in vacuum oven at 50° C. for 16 hours. The asymmetric membranes were then consecutively tested for pure gas helium, nitrogen, and carbon dioxide permeabilities at 100 psig (0.69 kPa), 25° C. The results are reported below:

He Productivity: 473 GPU
$N_2$ Productivity: 46 GPU
$CO_2$ Productivity: 1,122 GPU
He/$N_2$ Selectivity: 10
$CO_2$/$N_2$ Selectivity: 24

EXAMPLE 24

Asymmetric membranes were cast from a 20% by weight solution of the polymer of Example 1 in a N-methyl pyrrolidone:water (97:3) solution (weight) onto a glass plate at 50° C. with a 15-mil ($3.8 \times 10^{-4}$ m) knife gap. The films were dried on the plate at 50° C. for 2.0 minutes and then precipitated in deionized water. After the resulting white asymmetric membranes had sat in deionized water for 24 hours, they were placed in isopropanol. The isopropanol was replaced with fresh isopropanol after 6 hours. After 24 hours in isopropanol the membranes were dried in a vacuum oven at room temperature overnight. The membranes were treated with a 10% SYLGARD® 184 solution in FREON® 113 (weight/volume) and dried in vacuum oven at 50° C. for 16 hours. The asymmetric membranes were then consecutively tested for pure gas helium, nitrogen, and carbon dioxide permeabilities at 100 psig (0.69 kPa), 25° C. The results are reported below:

He Productivity: 352 GPU
$N_2$ Productivity: 35 GPU
$CO_2$ Productivity: 873 GPU
He/$N_2$ Selectivity: 10
$CO_2$/$N_2$ Selectivity: 25

EXAMPLE 25

Asymmetric membranes were cast from a 20% by weight solution of the polymer of Example 1 in a N-methyl pyrrolidone:water (97:3) solution (weight) onto a glass plate at 50° C. with a 15-mil ($3.8 \times 10^{-4}$ m) knife gap. The films were dried on the plate at 50° C. for 3.0 minutes and then precipitated in deionized water. After the resulting white asymmetric membranes had sat in deionized water for 24 hours, they were placed in isopropanol. The isopropanol was replaced with fresh isopropanol after 6 hours. After 24 hours in isopropanol the membranes were dried in a vacuum oven at room temperature overnight. The asymmetric membranes were then consecutively tested for pure gas helium, nitrogen, and carbon dioxide permeabilities at 100 psig (0.69 kPa), 25° C. The results are reported below:
He Productivity: 700 GPU
$N_2$ Productivity: 80 GPU
He/$N_2$ Selectivity: 9

The above asymmetric membranes were treated with a 10% SYLGARD® 184 solution in FREON® 113 (weight/volume) and dried in a vacuum oven at 50° C. for 16 hours. The asymmetric membranes were then consecutively tested for pure gas helium, nitrogen, and carbon dioxide permeabilities at 100 psig (0.69 kPa), 25° C. Results are reported below:
He Productivity: 340 GPU
$N_2$ Productivity: 34 GPU
$CO_2$ Productivity: 976 GPU
He/$N_2$ Selectivity: 10
$CO_2$/$N_2$ Selectivity: 29

EXAMPLE 26

Asymmetric membranes were cast from a 20% by weight solution of the polymer of Example 3 in a N-methyl pyrrolidone:water (97:3) solution (weight) onto a glass plate at 50° C. with a 15-mil ($3.8 \times 10^{-4}$ m) knife gap. The films were dried on the plate at 50° C. for 1.0 minutes and then precipitated in deionized water. After the resulting white asymmetric membranes had sat in deionized water for 24 hours, they were placed in isopropanol. The isopropanol was replaced with fresh isopropanol after 6 hours. After 24 hours in isopropanol the membranes were dried in a vacuum oven at room temperature overnight. The membranes were treated with a 10% SYLGARD® 184 solution in FREON® 113 (weight/volume) and dried in vacuum oven at 50° C. for 16 hours. The asymmetric membranes were then consecutively tested for pure gas helium, nitrogen, and carbon dioxide permeabilities at 100 psig (0.69 kPa), 25° C. The results are reported below:
He Productivity: 297 GPU
$N_2$ Productivity: 17.3 GPU
$CO_2$ Productivity: 629 GPU
He/$N_2$ Selectivity: 17
$CO_2$/$N_2$ Selectivity: 36

The above asymmetric membranes were tested for mixed gas $O_2$/$N_2$ (21/79) (mole) permeabilities at 100 psig (0.69 kPa), 25° C. Results are reported below:
$O_2$ Productivity: 74 GPU
$O_2$/$N_2$ Selectivity: 3.9

EXAMPLE 27

Asymmetric membranes were cast from a 20% by weight solution of the polymer of Example 4 in a N-methyl pyrrolidone:water (97:3) solution (weight) onto a glass plate at 50° C. with a 15-mil ($3.8 \times 10^{-4}$ m) knife gap. The films were dried on the plate at 50° C. for 2.0 minutes and then precipitated in deionized water. After the resulting white asymmetric membranes had sat in deionized water for 24 hours, they were placed in isopropanol. The isopropanol was replaced with fresh isopropanol after 6 hours. After 24 hours in isopropanol the membranes were dried in a vacuum oven at room temperature overnight. The membranes were treated with a 10% SYLGARD® 184 solution in FREON® 113 (weight/volume) and dried in vacuum oven at 50° C. for 16 hours. The asymmetric membranes were then consecutively tested for pure gas helium, nitrogen, and carbon dioxide permeabilities at 100 psig (0.69 kPa), 25° C. The results are reported below:
He Productivity: 330 GPU
$N_2$ Productivity: 23 GPU
$CO_2$ Productivity: 526 GPU
He/$N_2$ Selectivity: 14
$CO_2$/$N_2$ Selectivity: 23

The above asymmetric membranes were tested for mixed gas $O_2$/$N_2$ (21/79) (mole) permeabilities at 100 psig (0.69 kPa), 25° C. Results are reported below:
$O_2$ Productivity: 86 GPU
$O_2$/$N_2$ Selectivity: 3.3

EXAMPLE 28

Asymmetric membranes were cast from a 20% by weight solution of the polymer of Example 4 in a N-methyl pyrrolidone:water (97:3) solution (weight) onto a glass plate at 50° C. with a 15-mil ($3.8 \times 10^{-4}$ m) knife gap. The films were dried on the plate at 50° C. for 3.0 minutes and then precipitated in deionized water. After the resulting white asymmetric membranes had sat in deionized water for 24 hours, they were placed in isopropanol. The isopropanol was replaced with fresh isopropanol after 6 hours. After 24 hours in isopropanol the membranes were dried in a vacuum oven at room temperature overnight. The asymmetric membranes were then consecutively tested for pure gas helium, nitrogen, and carbon dioxide permeabilities at 100 psig (0.69 kPa), 25° C. The results are reported below:
He Productivity: 490 GPU
$N_2$ Productivity: 46 GPU
He/$N_2$ Selectivity: 11

The above asymmetric membranes were treated with a 10% SYLGARD® 184 solution in FREON® 113 (weight/volume) and dried in a vaccum oven at 50° C. for 16 hours. The asymmetric membranes were then consecutively tested for pure gas helium, nitrogen, and carbon dioxide permeabilities at 100 psig (0.69 kPa), 25° C. Results are reported below:
He Productivity: 292 GPU
$N_2$ Productivity: 19 GPU
$CO_2$ Productivity: 510 GPU
He/$N_2$ Selectivity: 15
$CO_2$/$N_2$ Selectivity: 26

The above asymmetric membranes were tested for mixed gas $O_2$/$N_2$ (21/79) (mole) permeabilities at 100 psig (0.69 kPa), 25° C. Results are reported below:
$O_2$ Productivity: 62 GPU
$O_2$/$N_2$ Selectivity: 3.0

EXAMPLE 29

Asymmetric membranes were cast from a 20% by weight solution of the polymer of Example 5 in a N-methyl pyrrolidone:water (97:3) solution (weight) onto a glass plate at 50° C. with a 15-mil ($3.8 \times 10^{-4}$ m) knife gap. The films were dried on the plate at 50° C. for 0.5 minutes and then precipitated in deionized water. After the resulting white asymmetric membranes had sat in deionized water for 24 hours, they were placed in isopropanol. The isopropanol was replaced with fresh isopropanol after 6 hours. After 24 hours in isopropanol the membranes were dried in a vacuum oven at room temperature overnight. The asymmetric membranes were tested for pure gas helium and nitrogen permeabilities at 100 psig (0.69 kPa), 25° C. The results are reported below:

He Productivity: 502 GPU
N$_2$ Productivity: 37 GPU
He/N$_2$ Selectivity: 14

These last asymmetric membranes were treated with a 10% SYLGARD® 184 solution in FREON® 113 (weight/volume) and dried in a vacuum oven at 50° C. for 16 hours. The asymmetric membranes were then consecutively tested for pure gas helium, nitrogen, and carbon dioxide permeabilities at 100 psig, 25° C. Results are reported below:

He Productivity: 300 GPU
N$_2$ Productivity: 18 GPU
CO$_2$ Productivity: 440 GPU
He/N$_2$ Selectivity: 17
CO$_2$/N$_2$ Selectivity: 25

These treated asymmetric membranes above were also tested for mixed gas O$_2$/N$_2$ (21/79) (mole) permeabilities at 100 psig (0.69 kPa), 25° C. Results are reported below:

O$_2$ Productivity: 140 GPU
O$_2$/N$_2$ Selectivity: 4.1

EXAMPLE 30

Asymmetric membranes were cast from a 20% by weight solution of the polymer of Example 5 in a N-methyl pyrrolidone:water (97:3) solution (weight) onto a glass plate at 50° C. with a 15-mil (3.8×10$^{-4}$ m) knife gap. The films were dried on the plate at 50° C. for 1.0 minutes and then precipitated in deionized water. After the resulting white asymmetric membranes had sat in deionized water for 24 hours, they were placed in isopropanol. The isopropanol was replaced with fresh isopropanol after 6 hours. After 24 hours in isopropanol the membranes were dried in a vacuum oven at room temperature overnight. The membranes were treated with a 10% SYLGARD® 184 solution in FREON® 113 (weight/volume) and dried in vacuum oven at 50° C. for 16 hours. The asymmetric membranes were then consecutively tested for pure gas helium, nitrogen, and carbon dioxide permeabilities at 100 psig (0.69 kPa), 25° C. The results are reported below:

He Productivity: 307 GPU
N$_2$ Productivity: 22.4 GPU
CO$_2$ Productivity: 502 GPU
He/N$_2$ Selectivity: 14
CO$_2$/N$_2$ Selectivity: 22

EXAMPLE 31

Asymmetric membranes were cast from a 20% by weight solution of the polymer of Example 5 in a N-methyl pyrrolidone:water (97:3) solution (weight) onto a glass plate at 50° C. with a 15-mil (3.8×10$^{-4}$ m) knife gap. The films were dried on the plate at 50° C. for 2.0 minutes and then precipitated in deionized water. After the resulting white asymmetric membranes had sat in deionized water for 24 hours, they were placed in isopropanol. The isopropanol was replaced with fresh isopropanol after 6 hours. After 24 hours in isopropanol the membranes were dried in a vacuum oven at room temperature overnight. The membranes were treated with a 10% SYLGARD® 184 solution in FREON® 113 (weight/volume) and dried in vacuum oven at 50° C. for 16 hours. The asymmetric membranes were then consecutively tested for pure gas helium, nitrogen, and carbon dioxide permeabilities at 100 psig (0.69 kPa), 25° C. The results are reported below:

He Productivity: 223 GPU
N$_2$ Productivity: 14.6 GPU
CO$_2$ Productivity: 568 GPU
He/N$_2$ Selectivity: 15
CO$_2$/N$_2$ Selectivity: 39

EXAMPLE 32

Asymmetric membranes were cast from a 20% by weight solution of the polymer of Example 5 in a N-methyl pyrrolidone:water (97:3) solution (weight) onto a glass plate at 50° C. with a 15-mil (3.8×10$^{-4}$ m) knife gap. The films were dried on the plate at 50° C. for 3.0 minutes and then precipitated in deionized water. After the resulting white asymmetric membranes had sat in dionized water for 24 hours, they were placed in isopropanol. The isopropanol was replaced with fresh isopropanol after 6 hours. After 24 hours in isopropanol the membranes were dried in a vacuum oven at room temperature overnight. The membranes were treated with a 10% SYLGARD200 184 solution in FREON® 113 (weight/volumn) and dried in vacuum oven at 50° C. for 16 hours. The asymmetric membranes were then consecutively tested for pure gas helium, nitrogen, and carbon dioxide permeabilities at 100 psig (0.69 kPa), 25° C. The results are reported below:

He Productivity: 215 GPU
N$_2$ Productivity: 11.3 GPU
CO$_2$ Productivity: 483 GPU
He/N$_2$ Selectivity: 19
CO$_2$/N$_2$ Selectivity: 43

EXAMPLE 33

Asymmetric membranes were cast from a 20% by weight solution of the polymer of Example 6 in a N,N-dimethyl formamide:formamide (95:5) solution (weight) onto a glass plate at 50° C. with a 15-mil (3.8×10$^{-4}$ m) knife gap. The films were dried on the plate at 50° C. for 2.0 minutes and then precipitated in water. After the resulting white asymmetric membranes had sat in slowly running warm water for 2 hours, they were placed in isopropanol for 1 hour. The membranes were dried in a vacuum oven overnight. The asymmetric membranes were tested for mixed gas O$_2$/N$_2$ (21/79) (mole) permeabilities at 100 psig (0.69 kPa), 25° C. The results are reported below:

O$_2$ Productivity: 300 GPU
O$_2$/N$_2$ Selectivity: 3.2

EXAMPLE 34

Asymmetric membranes were cast from a 20% by weight solution of the polymer of Example 13 in a N-methyl pyrrolidone:water (97:3) solution (weight) onto a glass plate at 50° C. with a 15-mil (3.8×10$^{-4}$ m) knife gap. The films were dried on the plate at 50° C. for 0.5 minutes and then precipitated in deionized water. After the resulting white asymmetric membranes had sat in deionized water for 24 hours, they were placed in isopropanol. The isopropanol was replaced with fresh isopropanol after 6 hours. After 24 hours in isopropanol the membranes were dried in a vacuum oven at room temperature overnight. The asymmetric membranes were then consecutively tested for pure gas helium, nitrogen, and carbon dioxide permeabilities at 100 psig (0.69 kPa), 25° C. The results are reported below:

He Productivity: 293 GPU
N$_2$ Productivity: 22 GPU
CO$_2$ Productivity: 416 GPU
He/N$_2$ Selectivity: 13
CO$_2$/N$_2$ Selectivity: 19

The above asymmetric membranes were treated with a 10% SYLGARD® 184 solution in FREON® 113 (weight/volume) and dried in a vaccum oven at 50° C. for 16 hours. The asymmetric membranes were then consecutively tested for pure gas helium, nitrogen, and carbon dioxide permeabilities at 100 psig (0.69 kPa), 25° C. Results are reported below:
　He Productivity: 237 GPU
　$N_2$ Productivity: 15.6 GPU
　$CO_2$ Productivity: 438 GPU
　He/$N_2$ Selectivity: 15
　$CO_2$/$N_2$ Selectivity: 28

The above treated asymmetric membranes were tested for mixed gas $O_2$/$N_2$ (21/79) (mole) permeabilities at 100 psig (0.69 kPa), 25° C. Results are reported below:
　$O_2$ Productivity: 68 GPU
　$O_2$/$N_2$ Selectivity: 3.8

EXAMPLE 35

Asymmetric membranes were cast from a 20% by weight solution of the polymer of Example 19 in a N-methyl pyrrolidone:water (97:3) solution (weight) onto a glass plate at 50° C. with a 15-mil ($3.8 \times 10^{-4}$ m) knife gap. The films were dried on the plate at 50° C. for 0.5 minutes and then precipitated in deionized water. After the resulting white asymmetric membranes had sat in the dionized water for 24 hours, they were placed in isopropanol. The isopropanol was replaced with fresh isopropanol after 6 hours. After 24 hours in isopropanol the membranes were dried in a vacuum oven at room temperature overnight. The membranes were treated with a 10% SYLGARD® 184 solution in FREON® 113 (weight/volume) and dried in vacuum oven at 50° C. for 16 hours. The asymmetric membranes were then consecutively tested for pure gas helium, nitrogen, and carbon dioxide permeabilities at 100 psig (0.69 kPa), 25° C. The results are reported below:
　He Productivity: 493 GPU
　$N_2$ Productivity: 21.8 GPU
　$CO_2$ Productivity: 756 GPU
　He/$N_2$ Selectivity: 23
　$CO_2$/$N_2$ Selectivity: 35

The above treated asymmetric membranes were tested for mixed gas $O_2$/$N_2$ (21/79) (mole) permeabilities at 100 psig (0.69 kPa), 25° C. Results are reported below:
　$O_2$ Productivity: 105 GPU
　$O_2$/$N_2$ Selectivity: 4.5

EXAMPLE 36

Asymmetric membranes were cast from a 20% by weight solution of the polymer of Example 19 in a N-methyl pyrrolidone:water (97:3) solution (weight) onto a glass plate at 50° C. with a 15-mil ($3.8 \times 10^{-4}$ m) knife gap. The films were dried on the plate at 50° C. for 1.0 minutes and then precipitated in deionized water. After the resulting white asymmetric membranes had sat in deionized water for 24 hours, they were placed in isopropanol. The isopropanol was replaced with fresh isopropanol after 6 hours. After 24 hours in isopropanol the membranes were dried in a vacuum oven at room temperature overnight. The membranes were treated with a 10% SYLGARD® 184 solution in FREON® 113 (weight/volume) and dried in vacuum oven at 50° C. for 16 hours. The asymmetric membranes were then consecutively tested for pure gas helium, nitrogen, and carbon dioxide permeabilities at 100 psig (0.69 kPa), 25° C. The results are reported below:
　He Productivity: 500 GPU
　$N_2$ Productivity: 25.7 GPU
　$CO_2$ Productivity: 802 GPU
　He/$N_2$ Selectivity: 20
　$CO_2$/$N_2$ Selectivity: 31

The above asymmetric membranes were tested for mixed gas $O_2$/$N_2$ (21/79) (mole) permeabilities at 100 psig, (0.69 kPa), 25° C. Results are reported below:
　$O_2$ Productivity: 110 GPU
　$O_2$/$N_2$ Selectivity: 3.9
and
　$O_2$ Productivity: 118 GPU
　$O_2$/$N_2$ Selectivity: 3.9

What is claimed:

1. A process for separating gases comprising bringing two or more gases under pressuer into contact with a membrane formed of an aromatic polyimide comprising units of the formula

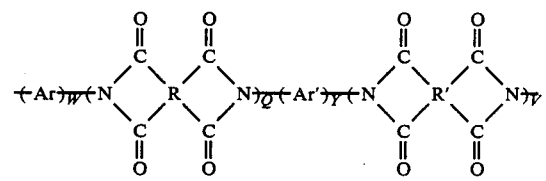

where —Ar— is

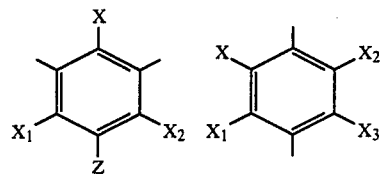

or mixtures thereof, R is

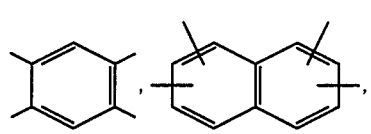

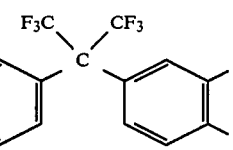

or mixtures thereof, —Ar'— is

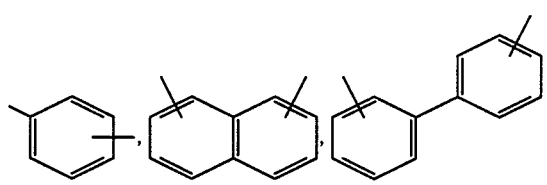

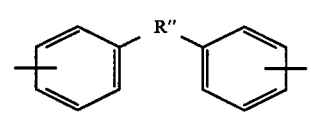

or mixtures thereof, is

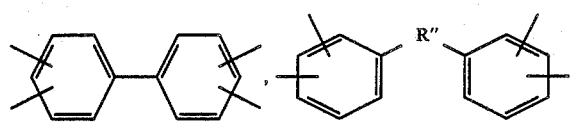

or mixtures thereof, and —R"— is

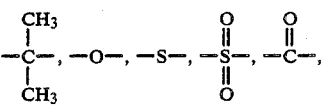

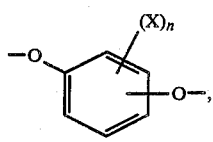

where n=0 to 4, alkylene radicals of 1 to 3 carbon atoms or mixtures thereof,

—X, —$X_1$, —$X_2$, and —$X_3$ are independently alkyl groups having 1 to 6 carbon atoms preferably methyl or ethyl, or aromatic groups of 6 to 13 carbon atoms, Z is —H, —X, —$X_1$, —$X_2$, or —$X_3$
W is 5% to 100%
Q is 5% to 100%
Y is 100% minus W
V is 100% minus V
Y plus V is at least 5%, whereby at least one of said gases is enriched upon permeating the membrane.

2. The The process of claim 1 wherein —X, —$X_1$, —$X_2$, or —$X_3$ are —$CH_3$ or —$C_2H_5$.

3. The process of claim 2 wherein R is

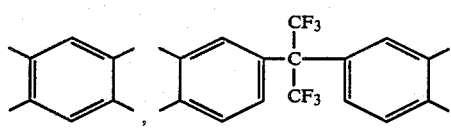

or mixtures thereof.

4. A gas separation membrane formed of an aromatic polyimide comprising units of the formula

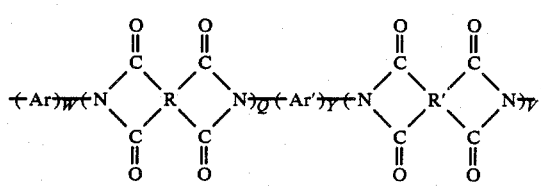

where —Ar— is

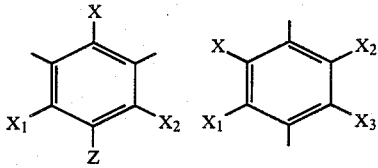

or mixtures thereof, —R— is

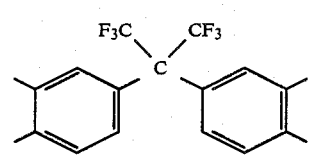

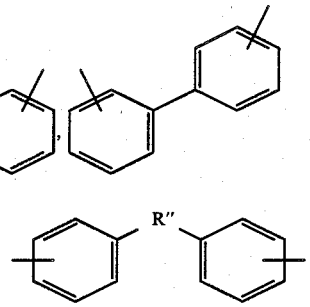

or mixtures thereof, —Ar'— is

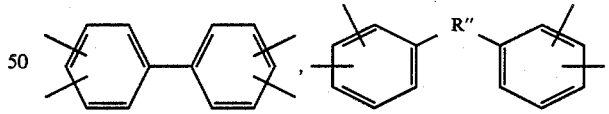

or mixtures thereof,

is

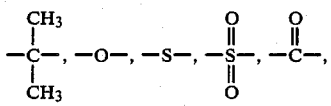

or mixtures thereof, and —R"— is

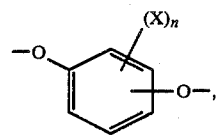

where n=0 to 4, alkylene radicals of 1 to 3 carbon atoms or mixtures thereof,

—X, —X₁, —X₂, and —X₃ are independently alkyl groups having 1 to 6 carbon atoms preferably methyl or ethyl, or aromatic groups of 6 to 13 carbon atoms, Z is —H, —X, —X₁, —X₂, or X₃

W is 5% to 100%

Q is 5% to 100%

Y is 100% minus W

V is 100% minus V

Y plus V is at least 5%.

5. The membrane of claim 4 wherein Y plus V is 10 to 50%.

6. The membrane of claim 5 wherein —X, —X₁, —X₂, or —X₃ are —CH₃ or —C₂H₅.

7. The membrane of claim 6 wherein Y is —0.

* * * * *

UNITED STATES PATENT OFFICE
CERTIFICATE OF CORRECTION

PATENT NO. : 4,717,394
DATED : January 5, 1988
INVENTOR(S) : Richard Allen Hayes It is certified that error appears in the above-identified patent and that said Letters Patent are hereby corrected as shown below:

, column 4, line 19; page 14, column 27, line 41; column 30, line 2, each instance change "V is 100% minus V" to read
--V is 100% minus Q--.

On page 2, column 3, line 53 change " >R'< " to read -- >R'< --.

In Claim 1, Column 27, line 4, change " >R'< " to read -- >R'< --.

In Claim 4, Column 28, line 43, change " >R'< " to -- >R'< --.

In Claim 4, Column 29, line 6, change

"Z is -H,-X, $-X_1$, $-X_2$ or $X_3$" to read

--Z is -H,-X, $-X_1$, $-X_2$ or $-X_3$--.

Signed and Sealed this

Eleventh Day of October, 1988

Attest:

DONALD J. QUIGG

Attesting Officer

Commissioner of Patents and Trademarks